United States Patent [19]

Mathes et al.

[11] Patent Number: 4,457,172

[45] Date of Patent: Jul. 3, 1984

[54] ELECTRONIC WHEEL BALANCER WITH SIGNAL CONDITIONING

[75] Inventors: Ray Mathes, Smyrna; Mark Van Dyke, Nashville, both of Tenn.

[73] Assignee: Hofmann Corporation Automotive Service Equipment, Lynchburg, Va.

[21] Appl. No.: 406,872

[22] Filed: Aug. 10, 1982

[51] Int. Cl.³ ............................................. G01M 1/22
[52] U.S. Cl. ........................................ 73/462; 364/508
[58] Field of Search .................. 73/462; 364/508, 550

[56] References Cited

U.S. PATENT DOCUMENTS

| | | | |
|---|---|---|---|
| 3,636,773 | 1/1972 | Harant | 73/466 |
| 3,732,737 | 5/1973 | Forster | 73/462 |
| 3,774,456 | 11/1973 | Crump | 73/462 |
| 3,910,121 | 10/1975 | Curchod et al. | 73/462 |
| 4,007,642 | 2/1977 | Jackson | 73/462 |
| 4,046,017 | 9/1977 | Hill | 73/462 |
| 4,060,002 | 11/1977 | Mortensen | 73/462 |
| 4,063,461 | 12/1977 | Buzzi | 73/462 |
| 4,085,619 | 4/1978 | Shapiro et al. | 73/462 |
| 4,149,416 | 4/1979 | Harant | 73/462 |
| 4,160,384 | 7/1979 | Guyot et al. | 73/462 |
| 4,169,383 | 10/1979 | Guyot et al. | 73/462 |
| 4,173,146 | 11/1979 | Kogler et al. | 73/462 |
| 4,193,305 | 3/1980 | Hunter | 73/462 |
| 4,285,240 | 9/1981 | Gold | 73/462 |
| 4,298,948 | 11/1981 | Davis | 364/508 X |

Primary Examiner—James J. Gill
Attorney, Agent, or Firm—Fleit, Jacobson, Cohn & Price

[57] ABSTRACT

A dynamic electric wheel balancer for measuring the imbalance condition in a vehicle wheel and indicating the position and correction weights required for balancing the wheel in one or two planes. The wheel balancer contains a rotating shaft in order to make the dynamic measurements. The shaft is freewheeling during measurement and is brought up to a predetermined minimum r.p.m. value through a motor and clutch arrangement. In order to take the measurements, piezoelectric sensors are used to measure the vertical force components exhibited by the imbalance condition of the vehicle wheel secured to the rotating main shaft. The measured force components are converted into digital form through the use of a voltage controlled oscillator and a counter in conjunction with a timing wheel.

6 Claims, 14 Drawing Figures

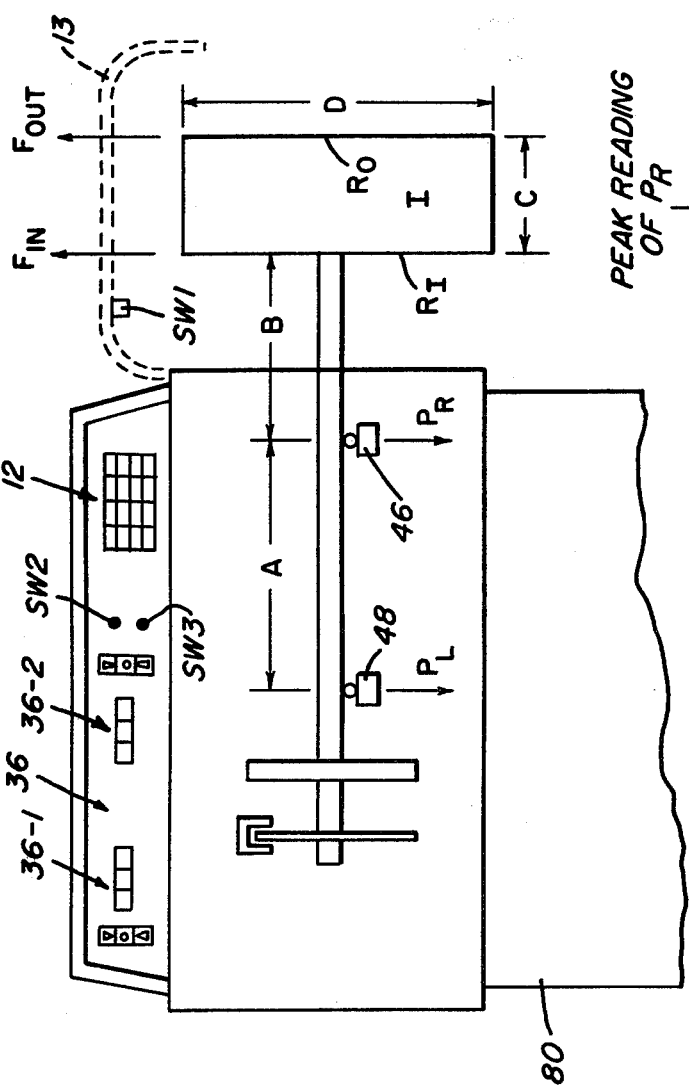
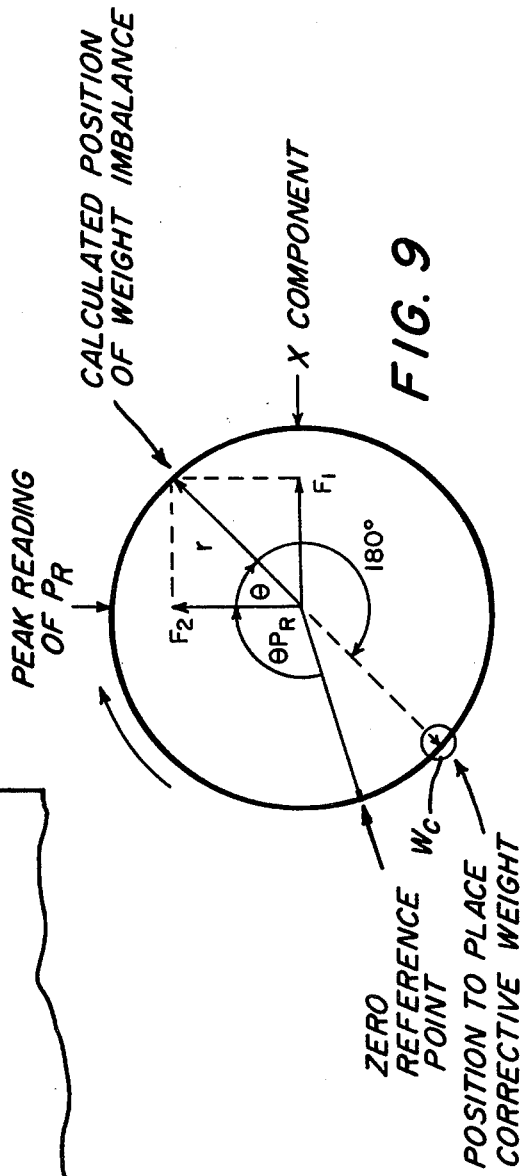
FIG. 10
FIG. 9
FIG. 8

ELECTRONIC WHEEL BALANCER WITH SIGNAL CONDITIONING

BACKGROUND OF THE INVENTION

1. Field of the Invention

The present invention relates generally to balancing machines and more particularly to a balancing machine for balancing vehicle wheels and indicating the position and weight required for balancing the wheel.

2. Background of the Prior Art

Prior art wheel balancers have generally been of two types: static or one plane balancers and dynamic or two plane balancers. In a static wheel balancer, the wheel is removed from the vehicle and is placed on a stand with the wheel generally defining a horizontal plane and the rotation axis of the wheel being disposed vertically and perpendicular to the plane. The stand permits the wheel to float and assume a stable position. A level bubble is associated with the wheel to be balanced and gives an indication of direction and degree of tilt of the rotation axis of the wheel. Weights are added until the rotation axis is truly vertical.

In a dynamic wheel balancer, the wheel is rotated either on the vehicle on which it is mounted or removed from the vehicle and mounted on a drive shaft of a wheel balancing machine and rotated. When the shaft and wheel are rotated, the out of balance forces cause the drive shaft to vibrate. The operator applies weights until the drive shaft remains on axis as the wheel is rotated.

In one type of dynamic balancer, a rotatable shaft receives an imbalanced wheel. The rotatable shaft is supported at several points where vibration transducers are fitted so that the imbalance is detected and compensated in two planes.

With conventional balancing devices, electric signals are produced by means of transducers which detect vibrations and produce electrical signals. These signals are used to determine the size and angular position of imbalance in both compensation planes, which, in the case of motor vehicle wheels, lie at the inside and outside of the rim. By applying the compensating weights at the determined points of the rim, i.e., in the corresponding planes of the imbalanced rotor, imbalances can be compensated statically and dynamically.

During dynamic balancing of imbalanced rotors, the latter are brought in rotation with the shaft carrying the imbalanced rotor, e.g., the motor vehicle wheel, supported in two planes. Basically, there are several ways to balance, which depend on the relation between the natural frequency of the rotor to be balanced and its suspension and the rotational speed of the imbalanced rotor to be tested.

Although the prior art devices provide generally reliable readings of weights and their positions, there is a price to be paid between accuracy and machine cost. Typically, the most accurate wheel balancers are relatively expensive. Thus, there is a need for a wheel balancing machine of the electronic type which provides highly accurate readings of the position and weight required for balancing a rotor, such as a vehicle wheel, the machine being of reduced cost. The present invention is directed toward filling that need.

SUMMARY OF THE INVENTION

The present invention relates to an electronic wheel balancer for measuring the imbalance condition in a vehicle wheel and indicating the position and correction weights required for balancing the wheel in one or two parallel planes. The wheel balancer contains a rotating shaft in order to make the dynamic measurements. The shaft is free wheeling during measurement and is brought up to a predetermined rate of rotation of approximately 300 r.p.m. through a motor and clutch arrangement. The wheel is allowed to coast down to about 250 r.p.m. where measurements are taken. After measurements have been made, a solenoid actuated brake, which takes advantage of the force factors associated with a flywheel forming part of the main shaft, brings the rotating shaft to a halt.

Prior to taking the measurements, the wheel balancer is calibrated by employing a known weight located at a known position on a face plate forming part of the main shaft. In order to take the measurements, piezoelectric sensors are used to measure the vertical force components exhibited by the imbalance condition of the vehicle wheel secured to the rotating main shaft. The analog force components are converted into digital form through the use of a voltage controlled oscillator and a counter in conjunction with a timing wheel.

The balancer contains a central processing unit which controls the execution of certain mathematical operations in order to evaluate the definite integral of each of the forces generated by the piezoelectric transducers and to use the cross correlation data generated by these integrations to find the zero crossing points and peak determinations. The wheel balancer is also capable of compensating for velocity variations taking place during the freewheeling rotation of the main shaft. The compensated data is processed and displayed in an eye readable format to tell an operator where to place a weight and what size the weight should be in order to correct the imbalance condition in the wheel.

BRIEF DESCRIPTION OF THE DRAWINGS

FIG. 8 is a schematic diagram used to explain the operation of the wheel balancer of FIG. 1.

FIG. 9 is a graphic representation used to explain the operation of the wheel balancer of FIG. 1.

FIG. 10 is a graphic display of the keys constituting the keyboard of FIG. 8.

DETAILED DESCRIPTION OF THE PREFERRED EMBODIMENT

Figure 1:
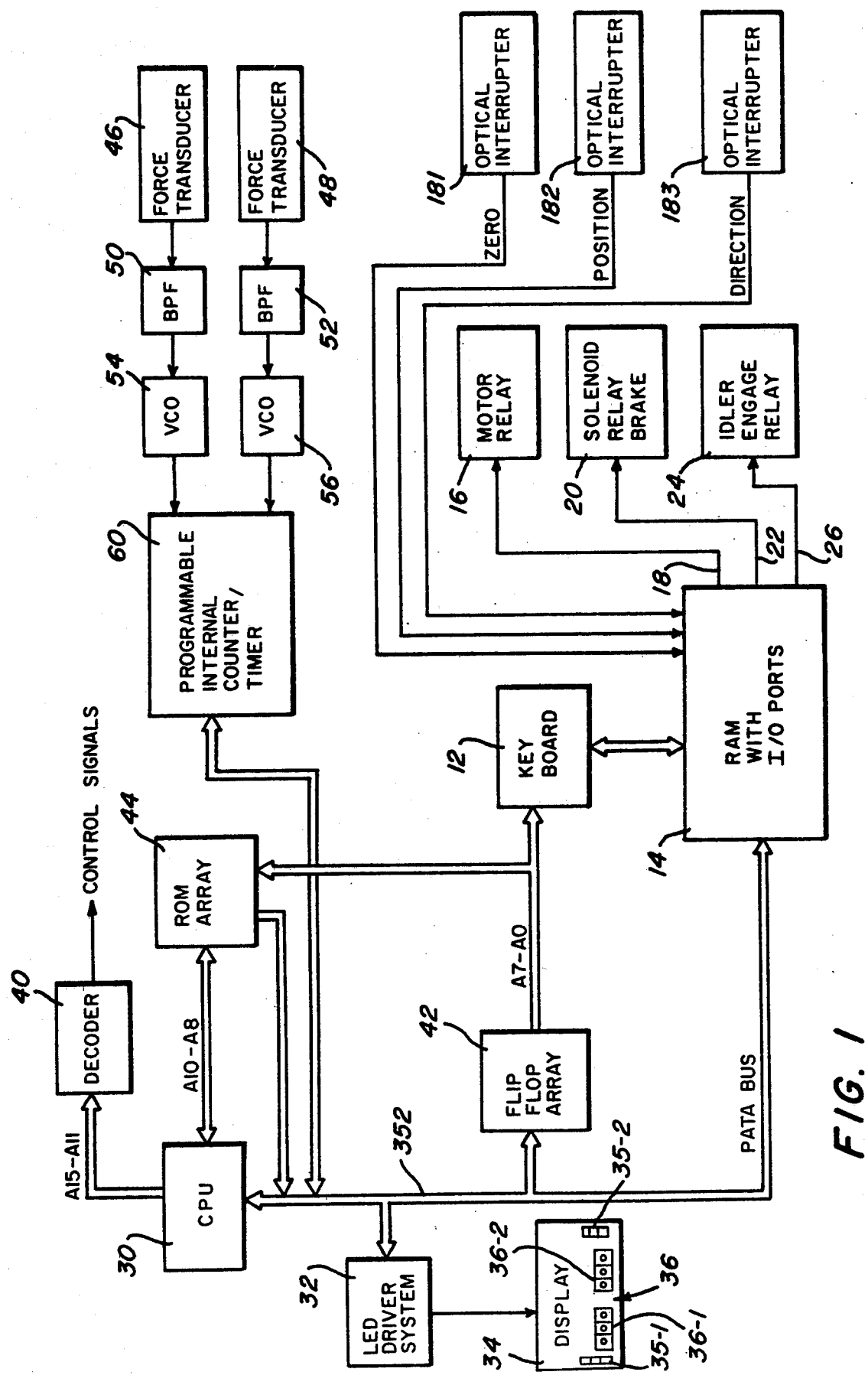
FIG. 1 is a block diagram showing the electronic circuitry found in a preferred embodiment of the electronic wheel balancer.

With references to FIGS. 1 through 8, an embodiment of an electronic wheel balancer embodying the teachings of the present invention will now be described. FIG. 1 provides a generalized diagram of the electronic components found in a preferred embodiment of the electronic wheel balancer, whereas FIGS. 5 through 7b provide generalized views of the mechanical components constituting the wheel balancer.

The theory behind the balancing of a wheel mounted on a rotating shaft of a balancing machine is well known. An unbalanced wheel mounted to the rotating shaft of a balancing machine can be simplified to a two-dimensional, simply supported beam with two induced forces acting on the cantilevered end. This is shown schematically in FIG. 8. As will be explained in greater detail hereinafter, two transducers 46 and 48 are sensitive to the vertical forces $P_L$ and $P_R$ generated by the vibration of the rotating shaft caused by the imbalance condition in the wheel T. To correct the wheel imbalance, weights must be placed in two planes of the wheel T. In conventional practice, these planes are defined by the inner rim $R_I$ and the outer rim $R_O$ of the wheel.

Summing the moments about the inner rim $R_I$ and the forces in the vertical direction, the following two relationships can be derived:

$$F_{OUT} = (-)\frac{P_L(A + B) + P_R(B)}{C} \quad (1)$$

$$F_{IN} = P_L + P_R - F_{OUT} \quad (2)$$

where $P_L$ and $P_R$ are the vertical force components detected by the piezoelectric transducers, $F_{IN}$ and $F_{OUT}$ are the force components associated with the inner and outer rims of the wheel T, A is the distance between the pair of piezoelectric transducers, B is the distance between the inner rim $R_I$ and the most forward transducer 46, and C is the distance between the parallel planes defined by the inner and outer rims.

In a balancing machine, such equations are solved based on known input data. Such data includes the radius or diameter D of the rotational path of weights attached to the wheel as well as the spacing C between parallel planes defined by and including the rotational paths of the inner and outer weights.

The weights are typically placed on the edge of the inner and outer rims of the wheel T, and, thus, the diameter D of the rotating path generally corresponds to the wheel diameter. Also, the spacing C between the planes defined by the rotating weights correspond substantially to the spacing between the rims. Thus, the above data as to diameter of the path of each weight, as well as the spacing between the planes, can be easily obtained by an operator by merely noting the stated wheel diameter and by measuring the distance between the rims using calipers or other means.

If we assume the shaft rotates at steady state, then both the previous equations must be valid at any point in the rotation.

In applying equations (1) and (2) to a three-dimensional rotation system, it must be assumed that the transducer design is such that the piezoelectric crystals sense only forces normal or perpendicular to the shaft axis and the horizontal support plane. Therefore, a rotation imbalance will be sensed as a sinusoidal force at the transducer locations. With these assumptions, the two corrective weights can now be compensated and located to counterbalance both static and dynamic or couple imbalance forces. In this regard, FIG. 9 graphically shows the considerations in measuring $P_R$.

The forces $P_L$ and $P_R$ are measured individually by recording their peak values averaged over four revolutions and their position values determined over two revolutions. This provides force data in polar coordinates which must be resolved into rectangular components so that the force equations (1) and (2) can be solved. The use of a sine lookup table provides the requirements for force resolution of x and y components. The force equations can then be solved for the $F_{IN}$ and $F_{OUT}$ forces in terms of x and y components. Once these are solved, the single resultant force vector r for the inner and outer locations can be determined through pythagorean and trigonometric analysis. In a preferred embodiment of the subject invention, it is only necessary to convert force $P_L$ from polar to rectangular coordinates because the zero point for solving the equations (1) and (2) for $F_{IN}$ and $F_{OUT}$ is at the maximum force angle of $P_R$. In this way, the X component of $P_R$ is always 0.

$$r = \sqrt{F_1^2 + F_2^2} \quad (3)$$

$$\theta = \operatorname{Tan}^{-1}\frac{F_1}{F_2} \quad (4)$$

where $\theta$ is the angle measured from the peak position of $P_R$ as shown in FIG. 9.

The resultant force r determined from the above analysis equates to the centrifugal force of a rotating corrective weight $W_c$ necessary for counterbalance. From the *Mechanical Engineers' Handbook* by Kent, p. 7.25, the counterbalancing centrifugal force is $$r = \frac{W_c\pi^2N^2D}{1800\,g} \text{ where} \quad (5)$$

where $W_c$ is in pounds-force, N is speed in REV/MIN, D is diameter in feet, and g is the gravitational constant. Solving for the unknown $W_c$ yields $$W_c = \frac{1800\,Rg}{\pi^2N^2D} \quad (6)$$

The angular position of the corrective weight would be $$\theta_c = \theta + 180 + (\theta P_R) \quad (7)$$

$P_R$ is the angle measured from the zero reference point to the peak reading of $P_R$. The zero reference point is determined when the wheel balancer is calibrated. The zero reference point is the zero tooth found on a timing wheel forming part of the invention. Final $\theta_c$ is actually measured from zero reference tooth as will be explained in greater detail hereinafter.

With reference to FIGS. 1 and 8, the rim distance B, rim width C and rim diameter D, information needed to determine where weights are to be placed on the inner and outer rims of the wheel T and also what those weight values are to be, is entered into a random access memory (RAM) 14 of the machine through a keyboard 12. Preferably, the RAM 14 is of a type bearing the designation 8155 as produced by Intel Corporation of Santa Clara, Calif. The Intel 8155 is a 2048 bit static MOS RAM with I/O ports that communicate with certain of the mechanical elements of the balancing system. In particular, one of the ports provides a control signal to a motor relay 16 along line 18, a control signal to a motor solenoid relay 20 via line 22, and a control signal to an idler engage relay 24 via line 26.

The RAM also receives and stores information relating to the position of a timing wheel (see 180, FIGS. 5 and 6) associated with the rotating shaft 162 of the wheel balancer. Two optical sensors 182 and 183 are used in conjunction with the timing wheel and will be described in greater detail hereinafter. Suffice it to say at this point, the two optical sensor signals, which are indicative of position and direction, are fed to and stored within the RAM 14 for later use in the system.

Forming the heart of the electronic portion of the wheel balancer is a central processing unit (CPU) 30. One such unit which fits the needs of the present wheel balancer system is the one bearing Product Designation No. 8085A as produced by Intel Corporation. The 8085A is a single chip 8-bit N channel microprocessor, which provides a complete 8-bit parallel CPU.

Also included as part of the electronics of the wheel balancer, is an light emitting diode (LED) driver system 32 which may be, for example, the universal driver system manufactured by Intersil of Cupertino, Calif. and bearing Product Designation No. ICM7218B. The LED driver system 32 is used to activate a 7-segment display 34 which contains six windows 36, arranged in two pairs of three with each window capable of displaying any one of the many alphanumeric symbols.

A decoder 40 is coupled to the CPU 30 and receives address data from the CPU. The decoder takes the address data and produces a plurality of control signals. These control signals will be discussed in detail hereinafter. Also coupled to the CPU is a flip-flop array 42. One such array is manufactured by Texas Instruments of Dallas, Tex. and bears Designation No. SN74LS374. The array contains eight flip-flops each of which is an edge triggered D-type flip-flop. This array latches the lower 8 address lines off of the multiplexed address-/data bus provided by the CPU 30.

Address data from the CPU is also provided to a read only memory (ROM) array 44 which, in the preferred embodiment, consists of five 16K UV erasable PROMS of the type bearing Designation No. 2716 and manufactured by Intel.

In addition to the information introduced into the system through the keyboard 12, other information, namely, the vertical forces being developed during the rotation of the shaft on which the unbalanced wheel is mounted, must also be introduced into the system. This is accomplished through the employment of two force transducers 46 and 48 mounted on the mechanical portion of the wheel balancer in a manner to be described hereinafter. Each of the force transducers develops a signal which passes through an associated bandpass filter 50, 52 and then to an assigned voltage controlled oscillator (VCO) 54, 56. The output of each VCO 54, 56 is fed into a programmable interval counter/timer 60 having three counters. One such counter/timer is produced by Intel and bears Product Designation No. 8253. The programmable interval counter/timer provides data to the data bus 352 of the system.

Figure 5:
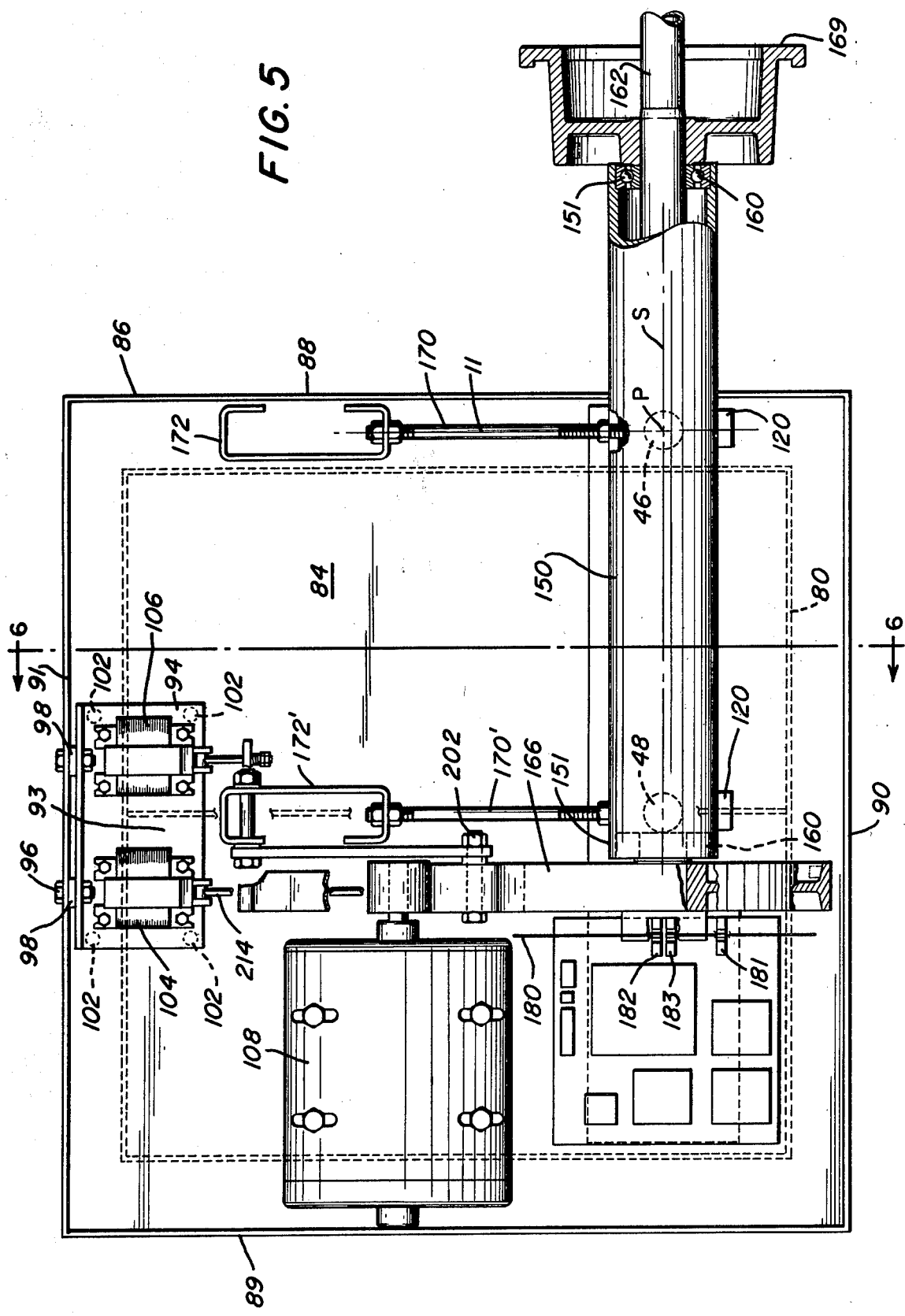
FIG. 5 is a top plan view of the mechanical components found in the preferred embodiment of FIG. 1. Certain portions are cutaway to reveal necessary details.
Figure 6:
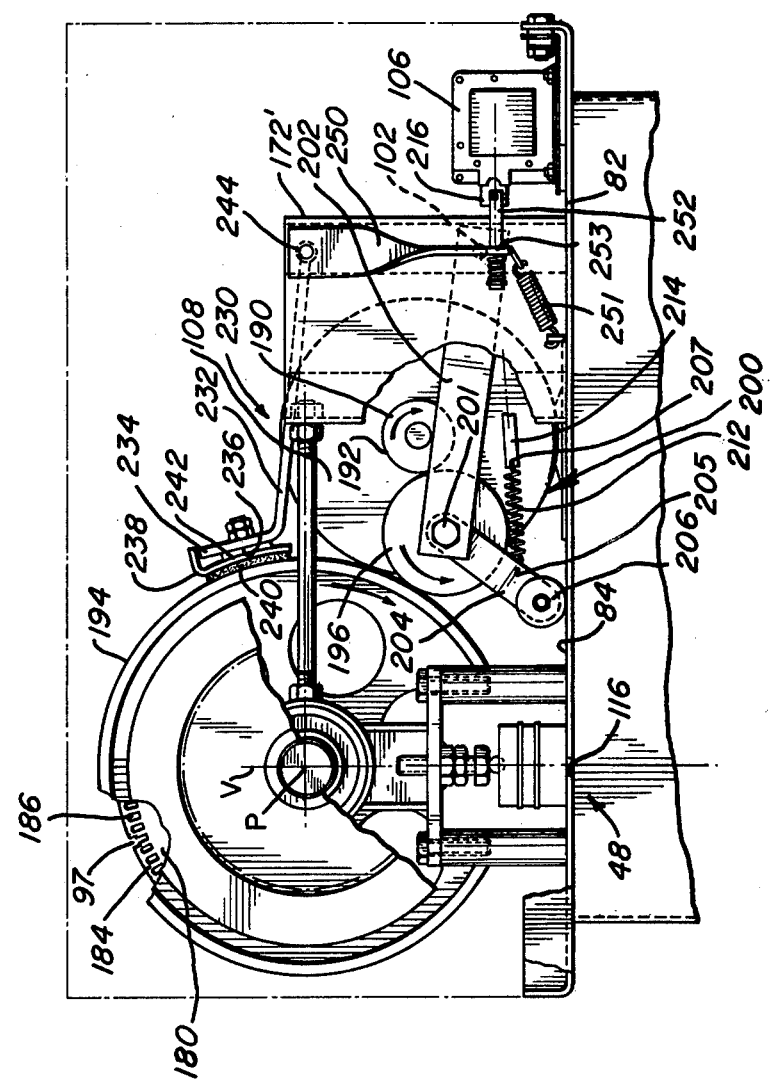
FIG. 6 is a view taken along line 6—6 of FIG. 5.
Figure 7A:
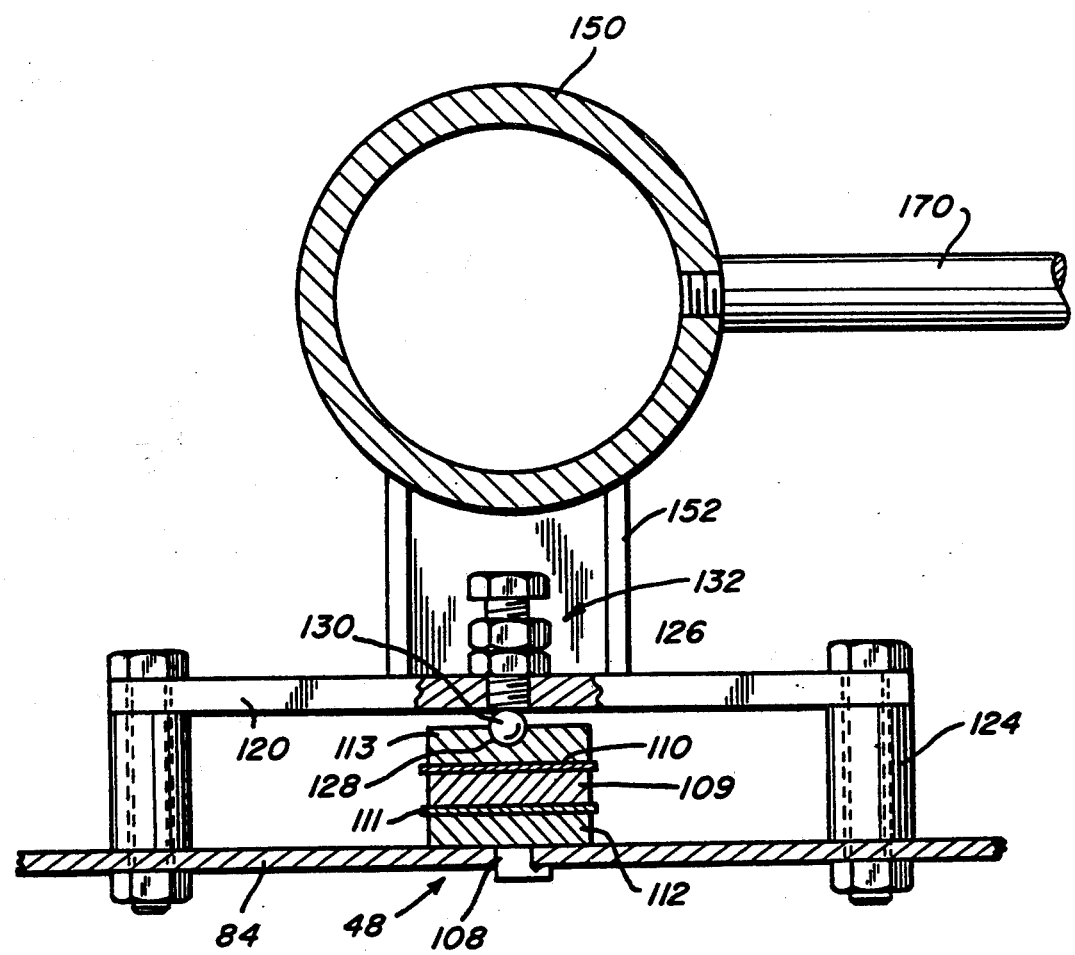
FIG. 7a is an enlarged view of the rotation housing with piezoelectronic transducer and horizontal support.

With reference to FIGS. 5 through 7, the mechanical elements of a preferred embodiment of the wheel balancer will now be generally discussed. The wheel balancer includes a stand 80 which supports a planar base 82 on which the various elements are mounted. The stand is of predetermined height to place the base a desired distance above the ground. The base 82 defines a generally planar top surface 84. The periphery of the surface 84 is bounded by an upwardly extending lip portion 86. As oriented in FIG. 5, lip 86 defines a right sidewall 88, left sidewall 89, a front sidewall 90 and a rear sidewall 91.

Secured to the rear sidewall 91 is a solenoid support plate 94. The plate is secured to the sidewall 91 by a pair of suitable fasteners, such as nuts and bolts 96 and rubber grommet 98. The extreme corners of the plate 94 rest on the base on a pair of suitable rubber feet 102. The plate 94 is spaced from the base 82 by the rubber feet 102. The rubber components 98 and 102 act as noise suppressors and place the plate 94 in a floating condition for vibration absorption.

As viewed in FIG. 5, an idler solenoid 104 is mounted on the left side of the top surface 93 of plate 94 and a brake solenoid 106 is mounted on the right side of the top surface of plate 94.

A piezoelectric crystal is mounted in a conventional manner in a central aperture 108 defined in the base 84 and mounting location 116. A steel bar 120 spans transversely across the piezoelectric crystal. Each end of the bar 120 contains an aperture for receiving a fastening bolt 122 for mounting the plate to the base 84. The distance between the flat portion of base 84 and the plate is maintained by the use of a suitable spacer 124. The transducer assembly, generally designated as 48, basically comprises a planar piezoelectric crystal 109 bounded on each planar surface by copper boards 110 and 111 which, in turn, are sandwiched between a locator washer 112 and an upper force receiving disk 113. The copper boards 110 and 111 are configured in such a way that they present an insulated surface to the upper and lower disks 112 and 113. The copper boards contain appropriate connectors for receiving the signals generated by the piezoelectric crystal 109.

The steel plate contains an aperture 126 opposite the central portion of the upper disk 113 of the piezoelectric transducer 48. The upper disk, in turn, contains a cutaway portion 128 configured to receive a portion of a steel ball bearing 130. A fastener assembly 132 passes through the hole 126 so that the ball bearing is placed under a predetermined tension against the piezoelectric crystal. In this way, the piezoelectric crystal is preloaded and the ball bearing acts to transfer all of the load normal and into the center of the crystal. A similar arrangement of steel bar, ball bearing and fasteners is provided at the mounting portion in association with piezoelectric crystal 46. An elongated tube 150 is supported on each of steel bars 120 by a pair of channel tube supports 152. These tube supports are positioned in close proximity to each of the piezoelectric crystals. In the preferred embodiment, each of the tube supports is secured to the elongated tube 150 and each of the steel bars 120 by welding.

The tube 150 is substantially hollow and terminates at each end in bearing receiving portion 151. Mounted for rotary movement within the hollow portion of the tube by bearings 160 is main shaft 162.

Figure 7B:
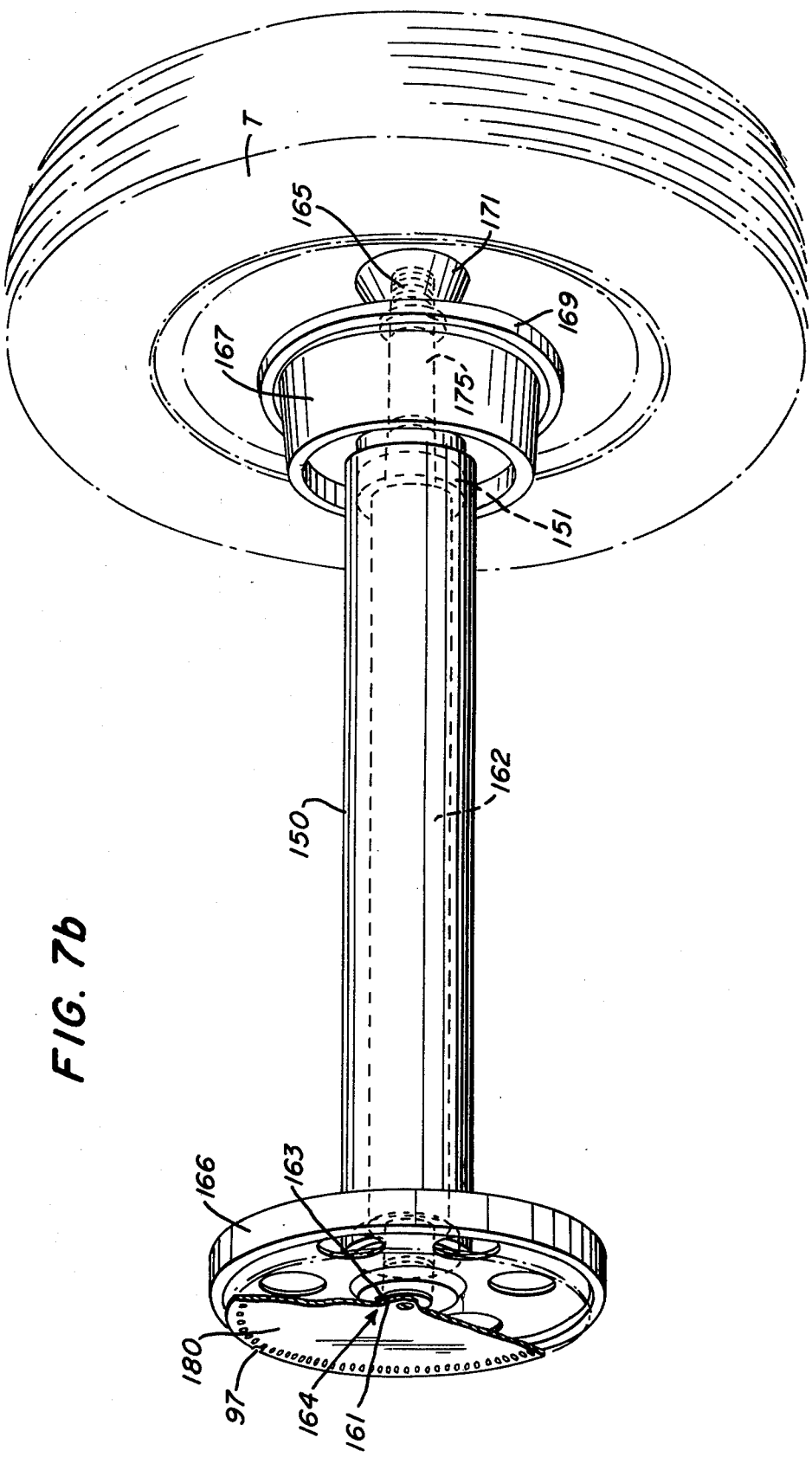
FIG. 7b is a perspective view showing the details of the rotating shaft assembly.

As oriented in FIG. 7b, back end 164 of the main shaft 162 is of reduced radius and is configured to receive a cast-iron flywheel 166. As shown in FIG. 7b, the flywheel has a keyway 161 which mates with a key 163 defined at the back end of the main shaft. The front end 165 of the main shaft, on the other hand, terminates in a threaded portion behind which is defined a smooth portion 175 of predetermined length. The smooth portion receives a generally cylindrically shaped faceplate 167. The threaded portion extends a sufficient distance beyond the face 169 of the faceplate so that a wheel to be balanced may be mounted on the main shaft and secured thereto by a conventional fastener 171.

Because the accuracy of the measurement of the vertical component of force is paramount, an arrangement is provided to eliminate, as much as possible, any horizontal component of force. With reference to FIGS. 5 through 8, the main shaft 162 is centrally positioned within the rotation tube 150 so that the longitudinal axis S of the main shaft defines the centerline of force. At the center of each of the ball bearings there is defined a force point where the force is transferred to the indentation within the piezoelectric transducer. A line drawn from the force point perpendicular to the planar surface of the piezoelectric crystal intersects the longitudinal axis S of the main shaft at the center point of force P. The vertical component of force will act on the piezoelectric crystal along the line V. In order to eliminate the horizontal force component, a support rod 170 has one end secured to the tube 150 and the other end secured to the base 82 through the intermediary of an upright clamping member 172. The longitudinal axis H of the rod is positioned so that it is perpendicular to both the longitudinal axis S of the main shaft and the vertical axis V, while at the same time passing through the center point of force P. A similar horizontal support arrangement is associated with the rear piezoelectric sensor 48.

Secured to the back end of the main shaft is a timing disc 180. Positioned about the rim of the disc are 96 equally spaced slots. At the periphery of the disk is an enlarged slot 97 which acts as the zero recognition slot. Positioned in a particular manner are three optical interrupters 181, 182 and 183. Each interrupter comprises a light source, such as an LED, directed toward a photocell. The first two optical interrupters 182 and 183 are associated with the slots 186, whereas the third optical interrupter 181 is associated with the zero slot 97. As can be seen, as the disc rotates in a given direction, the spaces 184 between each of the slots 186 interrupt the light from the light source passing to each of the photocells of interrupters 182 and 183 in a predetermined manner. The optical interrupters, in turn, each generate a signal which is interpreted by the computing portion in order to provide an indication of position and direction. The third optical interrupter 181 is used only during calibration to indicate the true absolute zero or reference position of the shaft for phase calibration.

Mounted on the base surface 84 near the flywheel is a motor 108. The motor terminates in a drive wheel 190 which, as viewed in FIG. 6, rotates in a generally clockwise direction. Disposed between the peripheral surface 192 of the drive wheel 190 and the peripheral surface 194 of the flywheel 166 is an idler wheel assembly generally designated as 200. It is through the control of the idler assembly that the drive wheel is able to cause the flywheel to rotate and bring the main shaft up to a desired rotation rate of at least 200 r.p.m. It is also the idler assembly which then permits the flywheel and the main shaft to operate in a freewheeling condition.

The idler assembly includes an idler wheel 196. The idler wheel rotates about a bolt assembly 201 that joins one end of an elongated idler arm 202 to one end of an elongated idler leg 204. The other end of the idler leg 204 is pivotally mounted to it a guide wheel 206, the peripheral portion of which generally contacts the planar base surface 84. The other end of the idler arm 202 is pivotally mounted to the back end of mounting bracket 172'. An aperture 205 is provided in the end of leg 204 above the guide wheel 206. One end of a tension spring 212 has one end mounted in the aperture 205 and the other end mounted in an aperture 207 provided in a throw rod 214.

The free end of the throw rod 214 is secured to the plunger portion 216 of the solenoid 104. As shown in FIG. 6, the tension spring 212 is of predetermined magnitude so as to maintain a constant force by linkage 214 on the arm 204 after the solenoid 104 has bottomed out.

Also included in the drive system is a brake assembly generally designated as 230. The brake assembly includes a brake pad support arm 232 which ends in a generally flat front portion 234 that contains an aperture 236 for mounting a brake shoe 238. The shape of the brake shoe generally conforms with the peripheral portion of the flywheel. Mounted to the brake shoe is a resilient brake pad 240. The brake shoe is mounted to the arm 232 by a conventional fastening device. Interposed between the brake shoe and front portion of the arm is an O-ring 242 which provides a spherical joint for the brake shoe. The other end of the mounting arm 232 pivots about a pivot pin 244 which is mounted to the support 172'. Forming an integral part of the mounting arm 230 is a brake arm 250. One end of the brake arm is secured to the end of the mounting arm that pivots about pin 244. The other end 253 of the brake arm contains an aperture which receives a linking rod 252. The other end of the rod 252 is secured to the plunger of solenoid 106. A tension spring 251 is connected to both the base 82 and the end 253 of the brake arm 250. The spring serves to disengage the brake when the solenoid 106 is deactivated.

The brake assembly provides an inexpensive braking system for the free spinning flywheel in which the shaft loading during braking is essentially transverse to the piezoelectric sensors 46 and 48 and axially to the reinforcing rods 170 and 170'.

The brake shoe 238 has a limited spherical freedom to maintain an even pressure distribution and even wear on the brake pad 240. The geometry of the brake shoe is such that the friction force vector assists in increasing the applied brake normal force without approaching a jamming condition.

The idler assembly 200, on the other hand, provides a self-assisting clutch system for the free spinning flywheel 166. The clutch assembly uses the solenoid 104 to lift the idler 196 into contact with the drive wheel 190 and the flywheel. With the appropriate angles of intersection to ensure a no slip condition, the frictional forces created during the torque of motor start-up tend to pull the idler into tighter engagement. In determining the appropriate angles of intersection, an important feature is to locate the idler 196 on the appropriate side of a line between the centers of the drive wheel 190 and the flywheel such that the frictional forces assist rather than repel the idler force. This then reduces the pulling force required by the solenoid 104 and reduces idler bounce during start-up of the motor and flywheel. This self-assisting feature reduces the pull or push force required to maintain a no slip or loss of torque during start-up.

Having briefly described both the electronic and mechanical portions of the wheel balancer, the details of the various electronic components for a preferred embodiment of the inventive wheel balancer will now be presented.

Figure 2:
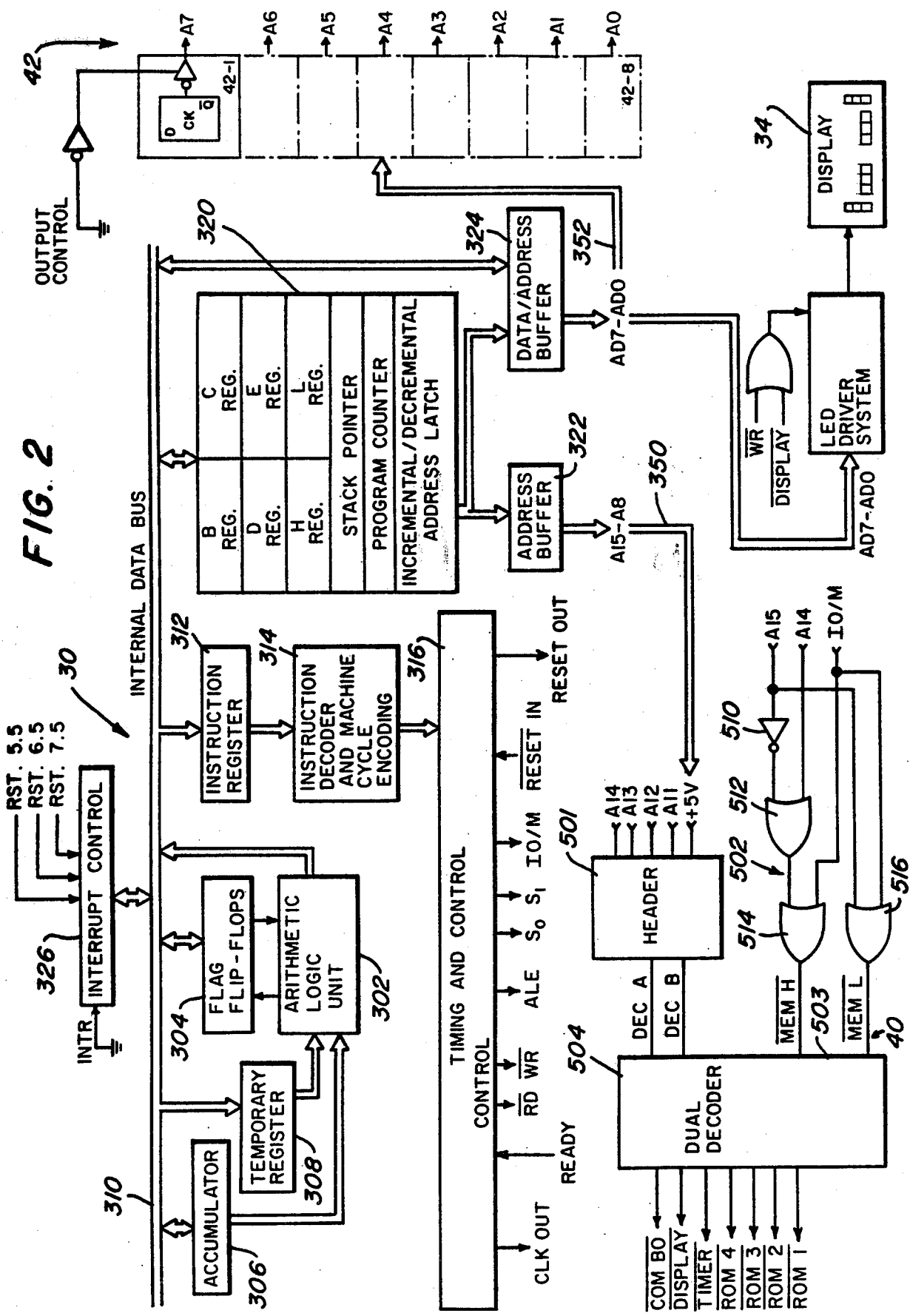
FIG. 2 is a block diagram showing the details of the central processing unit, the flip-flop array, and the display of FIG. 1.

With reference to FIG. 2, at the heart of the system is the central processing unit (CPU), generally designated as 30. The unit is preferably an 8085A, such as that manufactured by Intel. At the center of the CPU is an 8-bit arithmetic logic unit 302. Interacting with the ALU are 5-bit flag flip-flops 304. Also provided are an 8-bit accumulator 306 and an 8-bit temporary register 308. The accumulator receives and transmits data to an internal data bus 310. The temporary register 308 receives data from the data bus, whereas the flag flip-flops 304 receive and transmit data to the internal data bus. Also included as part of the CPU are an instruction register 312 and an instruction decoder with machine cycle encoding 314. Data is transmitted from the internal data bus to the instruction register and the instruction decoder into a timing and control block 316. The CPU also contains a register array 320 consisting of six 8-bit registers, a 16-bit stack pointer, a 16-bit program counter, and a 16-bit incremental/decremental address latch. Data is passed to and from the data bus and the register array. Finally, the CPU includes a appropriate address buffer 322 and a data/address buffer 324. Also provided is an interrupt control 326.

The address buffer 322 places data on the address bus 350 in the form of the eight most significant bits of the memory address or the eight most significant bits of the I/O address. The data/address buffer, on the other hand, places data on multiplexed address/data bus 352. The lower eight bits of the memory address (or the I/O address) appear on the bus during the first clock cycle of a machine cycle. It then becomes the data bus during the second or third clock cycles.

The timing and control portion 316 provides an ALE (address latch enable) signal. This signal occurs during the first clock state of a machine cycle and enables the address to get latched into the on chip latch of the CPU peripherals. The S0, S1 and $\overline{\text{I/OM}}$ control signals determine the machine cycle system and control such operations as memory write, memory read, I/O write, I/O read, op code fetch, interrupt acknowledge, halt, hold and reset.

There is also provided a read control signal $\overline{\text{RD}}$ and a write control signal $\overline{\text{WR}}$. The CPU responds to the input of a ready signal. If READY is high during a read or write cycle, it indicates that the memory or a peripheral is ready to send or receive data. If READY is low, the CPU will wait an interval number of clock cycles for READY to go high before completing the read or write cycle.

On the interrupt control 326, the INTR (interrupt request) is constantly grounded. The CPU is responsive to three restart interrupts: RST5.5, RST6.5, and RST7.5.

These three interrupts have the same timing as INTR except that they cause an internal restart to be automatically inserted. A TRAP signal is provided by the interrupt control and is a nonmaskable restart interrupt. The CPU responds to a RESET IN which sets the program counter to zero and resets the interrupt enable and HLDA flip-flops. The RESET OUT indicates that the CPU is being reset. The CLK OUT is the clock output for use as a system clock.

The decoder 40 is made up of a header 501, a series of logic gates collectively referred to as 502 and a dual decoder 504. The header is a conventional lead selection device which makes use of wire jumpers to determine which of bits A11 through A14 will be used to create the decoder signals DECA and DECB. This is done so that there is some flexibility in the machine during manufacture to use different EPROM's. In this way, the header supplies the encoded ROM address bits (A11 and A12, or A12 and A13, or A13 and A14) to the dual decoder 504 which is a dual 1-of-4 decoder such as that manufactured by Texas Instruments and bearing Product Designation No. 74LS 139. Data lines A14 and A15 along with the $\overline{\text{IO/M}}$ signal generated by the timing and control 316 are fed into discrete logic 502 to generate the $\overline{\text{MEMH}}$ and the $\overline{\text{MEML}}$ signals which are fed into the dual decoder. The signal A15 is first fed through an inverter 510, the output of which is fed into one input of a dual input OR gate 512. The output of the OR gate is then fed to an input of a dual-input OR gate 514, the output of which produces the memory high or $\overline{\text{MEMH}}$ signal. The second input of OR gate 512 receives the A14 data signal. In like manner, the second input of OR gate 514 receives the $\overline{\text{IO/M}}$ signal. A further OR gate 516 is provided. The output of this OR gate represents the $\overline{\text{MEML}}$ signal. This signal is produced by putting A15 into one input of the OR gate 516 and the IO/M not signal into the other input of the OR gate 516.

The output of the dual decoder contains the various signals used to control certain of the operations in the wheel balancer. The $\overline{\text{DISPLAY}}$ signal is fed into one input of an OR gate 430 and the $\overline{\text{WR}}$ signal is fed into the other input of the OR gate to produce a drive signal which is fed into the LED driver system 32 on line 432.

AD7-AD0 from the data bus 352 are received by the flip-flop array 42. The array is made of eight registers 42-1 through 42-8. Each of the registers consists of an edge triggered D-type flip-flop. On the positive transition of the clock ($\overline{\text{ALE}}$), the Q outputs are set to the logic states that were set up at the D inputs. Each of the registers has a Q output and a data signal. The eight registers collectively latch the least significant bits of the address bus from the multiplexed address/data bus of the CPU 30. As will be explained hereinafter, the four most significant bits (A7 through A4) are used in conjunction with the keyboard 12. The two least significant bits (A1 and A0) are used in connection with the read/write logic associated with the programmable interval timer 60. A0-A7 are fed along with A8-A12 to the ROM array 44 for internal selection. A3 is a general address bit used in ROM cell selection.

With continuing reference to FIG. 2, the data on the data bus 352 is also received by the LED driver system 32. One such driver system found to be applicable to the present application is the one made by Intersil in the ICM7218 series. The device is a universal 8-digit LED driver system. Featured as part of the system are digit and segment drivers.

The driver system under the control of the $\overline{\text{WR}}$ and $\overline{\text{DISPLAY}}$ signals causes the information to be expressed in an eye readable format on the display 34. In a preferred embodiment, separate inner and outer digital readouts are provided. There is also provided a 3- digit, 7-segment LED display 36-1 for and a 3-digit 7-segment LED display 36-2.

Weights to be added are displayed as a three-digit number with a decimal point. The left display 36-1 corresponds to the inner plane ($F_{IN}$). The right display 36-2 corresponds to the outer plane ($F_{OUT}$). The angular positions are displayed on the LED indicators 35-1 and 35-2. Each of the indicators consists of a green LED bounded on each side by a red LED. As oriented in FIG. 1, the top red LED tells the operator to rotate the wheel counterclockwise. The bottom LED tells the operator to rotate the wheel clockwise. When the center or green LED is on, the imbalance position is at the top of the wheel. The left set of LEDs 35-1 corresponds to the angle associated with the inner plane ($F_{IN}$), whereas the right set of LEDs corresponds to the outer plane ($F_{OUT}$).

Figure 4:
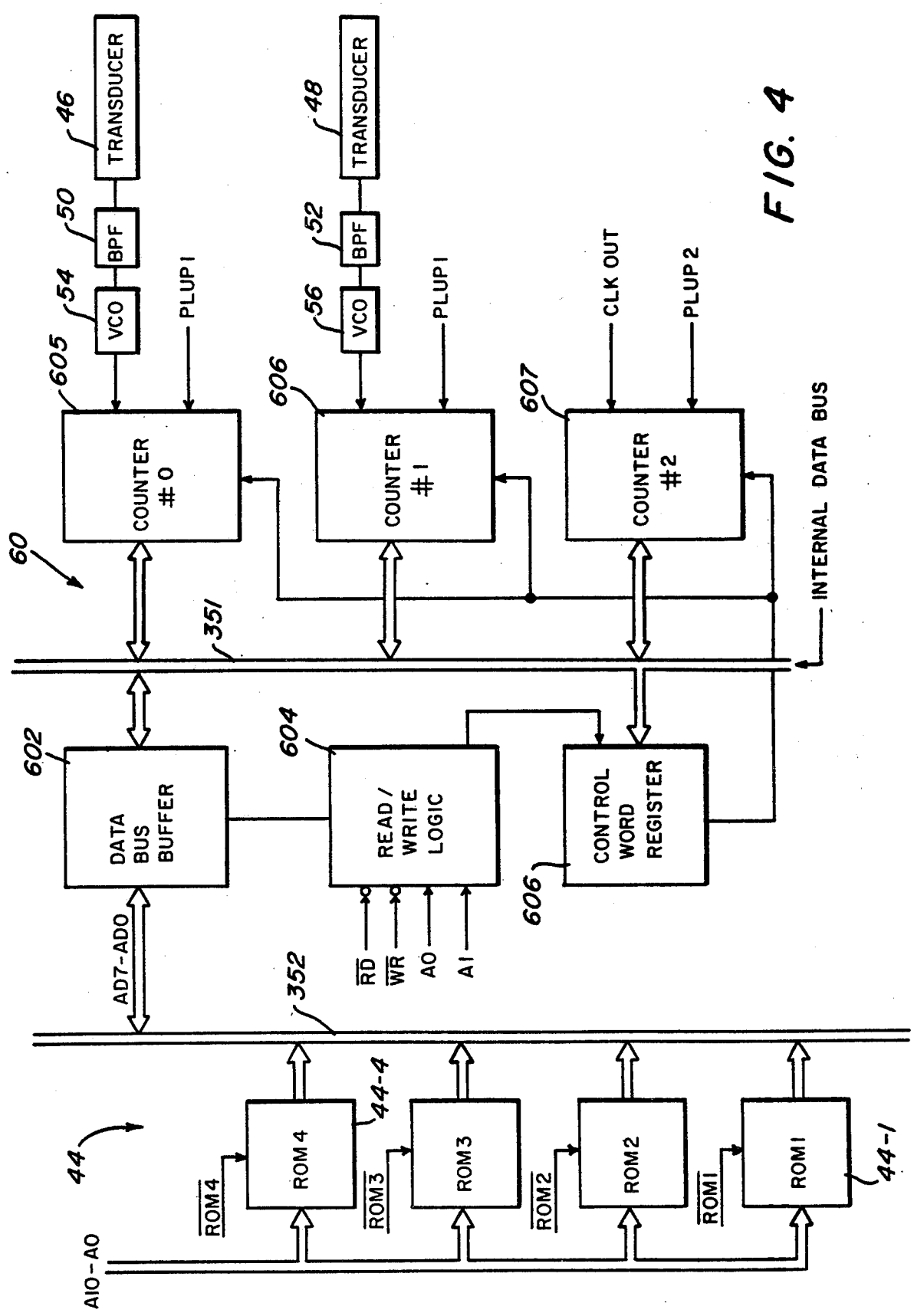
FIG. 4 is a block diagram showing the ROM array, programmable interval timer, and the force transducers of FIG. 1.

With reference to FIG. 4, the way in which the signals from the two piezoelectric crystals 46 and 48 are placed into the system will now be described.

In order to efficiently measure weight and angle, it is necessary to obtain a digital representation of the analog inputs from the piezoelectric crystal sensors 46 and 48. In the preferred embodiment, the voltage controlled oscillators (VCO) 54 and 56 are employed in conjunction with the programmable interval timer 60. Each of the VCO's clocks a 16-bit counter as the analog-to-digital conversion hardware. The use of a VCO provides two advantages over the normal A-to-D converters. The nature of a VCO/counter configuration is to filter out sinusoidal noise on the analog input. Only odd harmonics of the base frequency are not filtered but such harmonics are not a problem in the present invention because of the free-wheeling nature of the detection system.

The interval timer 60 includes a data bus buffer 602, read/write logic 604 and a control word register 606. The timer also contains three identical counters 605 through 607. The data bus buffer 602 is a three-state, bi-directional, 8-bit buffer used to interface with the data bus 352. Data is transmitted or received by the buffer in accordance with instructions from the CPU. The data bus buffer has three basic functions. The buffer programs the modes of the interval timer, loads the count registers, and reads the count values.

The read/write logic 604 accepts inputs from the timing and control block 361 and 40 and, in turn, generates control signals for overall device operation. An $\overline{RD}$ signal into the read/write logic indicates that the CPU is inputting data in the form of a counters value. A low $\overline{WR}$ on the read/write logic informs the timer that the CPU is outputting data in the form of mode information or loading counters. The A0 and A1 inputs of the read/write logic are normally connected to the address bus. Their function is to select one of the three counters to be operated on and to address the control word register for mode selection.

The control word register 606 is selected when A0 and A1 are both high. It then accepts information from the data bus buffer and stores it in a register. The information stored in this register controls the operational MODE of each counter, selection of binary or BCD counting, and the loading of each count register.

Three counters 605 through 607 are identical so that only a single counter will be described. Each counter consists of a single, 16-bit presettable down counter. The counter can operate in either binary or BCD and its input, gate and output are configured by the selection of MODES stored in the control word register. The counters are fully independent and each can have separate mode configuration and counting operation, binary or BCD.

The output of VCO 54 is used as a clocking signal into counter 605. The same may be said of VCO 56 and counter 606. The clocking signal causes each of the counters to decrement its count register.

Counter 607 of the programmable counter/time 60 is used to measure wheel speed. This counter is set up to generate a RST7.5 interrupt every 16 milliseconds. The CPU 30 counts the number of these 16 millisecond interrupts which occur during a complete revolution to determine wheel velocity.

Each of the counters 605 through 607 receive a pull up signal. PLUP1 is placed into counter 605 and counter 606, whereas PLUP2 is placed into counter 607. These signals are generated by the resistive network generally designated as 510 in FIG. 3. These signals are used to ensure that the counters are always active in counting.

With continued reference to FIG. 4, the ROM array 44 is generally illustrated. The array consists of four 16K UV erasable PROMS 44-1 through 44-4. The PROMS are ultraviolet erasable and electrically programmable read only memories. Each of the ROMS are enabled through an associated ROM signal (for example, $\overline{ROM1}$) generated by the decoder 40. Each ROM is capable of delivering an 8-digit word (AD7–AD0) to the data bus 352 when selected.

Figure 3:
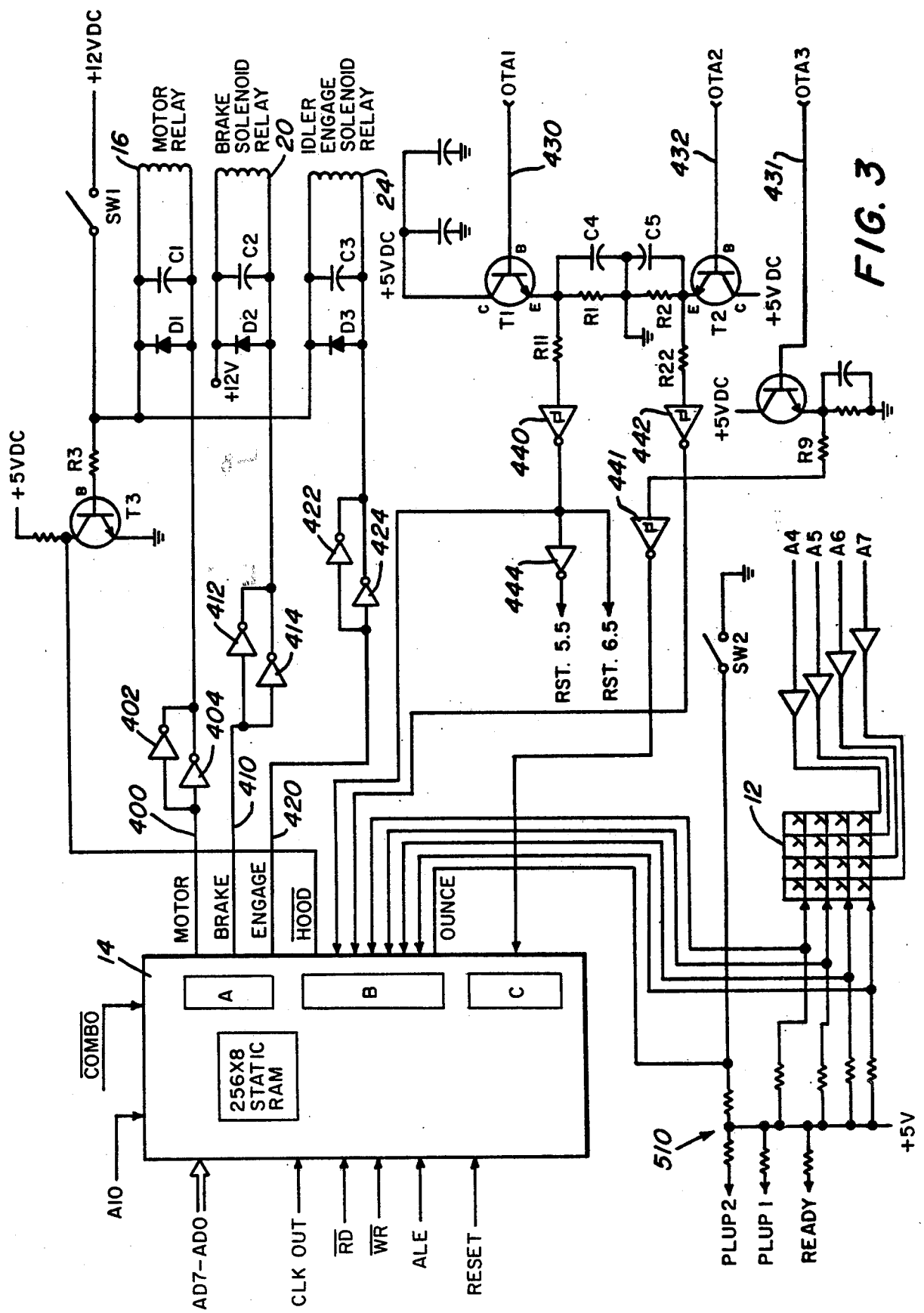
FIG. 3 is a block diagram showing the details of the RAM with I/O ports, the keyboard, the optical interrupters, and the motor solenoid and idler relays of FIG. 1.

With reference to FIG. 3, the operation of the RAM with I/O ports 14 will now be described. The RAM 14 in the preferred embodiment is manufactured by Intel and bears Product Designation No. 8155. In the preferred embodiment, the RAM portion is designed with 2048 static cells organized as 256X8. Three I/O ports (A, B and C) are provided. The mode of operation is determined by the A10 signal from the CPU. If the A10 signal is low, then the static memory is selected and if high then the input/output ports are selected. The chip is enabled by the $\overline{COMBO}$ signal generated by the decoder 40. The RAM 14 is clocked by the CLKOUT signal from the CPU. Read control for the RAM is provided by the $\overline{RD}$ signal whereas write control is provided by the $\overline{WR}$ signal. The ALE signal latches both the address on the AD7–AD0 lines and the state of the Chip Enable and $\overline{IO/M}$ into the chip at the falling edge of ALE. The reset signal from the CPU is used to initialize the system.

At I/O ports A, three signals are provided. These signals are noted as MOTOR, BRAKE, and ENGAGE. The MOTOR signal passes on line 400 through a pair of high current drivers 402 and 404 into a diode-capacitor arrangement D1 and C1 used for transient suppression to activate motor relay 16. In a similar manner, the BRAKE signal passes on line 410 through the pair of high current drivers 412 and 414 and through the parallel array of diode D2 and capacitor C2 to activate the brake solenoid relay 20. Finally, the ENGAGE signal passes on line 420 through the high current drivers 422 and 424 and through the diode and capacitor arrangement D3, C3 to activate the idler engage solenoid relay 24.

The second set of I/O ports B comprises eight lines which receive data from various peripheral devices.

The signals generated by the optical interrupters 182 and 183 are received, respectively, on lines 430 and 432. The OTA1 signal on line 430 is introduced into the base of the transistor T1. The collector of transistor T1 is connected to a +5-volt DC source.

The emitter of transistor T1 is connected to the filter network defined by resistors R1 and R11, and capacitor C4. The output of this filter network (which is used for noise suppression of the OTA signal) is connected to the input of a Schmitt trigger buffer 440. The output of the Schmitt trigger buffer provides the RST6.5 interrupt to the CPU and is also inverted by inverter 444 to produce the RST5.5 interrupt to the CPU. This OTA is used to determine wheel position.

At the same time, the OTA2 signal on line 432 is introduced to the base of transistor T2. The emitter of transistor T2 is connected to another filter network defined by resistors R2 and R22, and capacitor C5. The output of this filter network is connected to the input of Schmitt trigger buffer 442. The output of this buffer is fed to an input of port B on the RAM with I/O ports 14. This bit is used to determine the direction of wheel rotation.

The OTA3 signal on line 431 is introduced to the base of transistor T3. The emitter of transistor T3 is connected to another filter network defined by resistors R9 and R6 and capacitor C29. The output of this filter network is connected to the input of Schmitt trigger buffer 441. The output of this buffer is fed to an input of port C on the RAM with I/O ports 14. This bit is used to denote the zero reference point on the timing wheel.

Having described all of the elements constituting all of the electrical and mechanical portions of the wheel balancer, a description of the operation of the device will now be presented.

With reference to FIG. 8, a schematic representation of the front panel of the wheel balancer is shown. A power on switch SW3 activates the entire system. Switch SW1 is associated with a safety hood 13, shown in phantom, while switch SW2 appears on the control panel. The only remaining switches appearing on the control panel are those associated with the keyboard 12. The display 36 is broken up into separate inner and outer digital readouts 36-1 and 36-2. In this way, a separate 3-digit readout is provided for the inner and outer weights and also separate LED indicators (three of them) readouts are provided for the inner and outer positioning of the weights.

Turning now to the keyboard 12, the function of each of the 16 keys appearing on the board will now be presented. The key marked RW is used to introduce the rim width C into the system. The machine is configured to accept rim widths in the range from 3.0 to 12.9 inches. The rim width appears as a 3-digit number on the display portion 36-2.

The RD key is used to introduce the rim diameter D into the system. The machine is configured to accept rim diameters between 10.0 to 16.5 inches. As with the rim width, the rim diameter is also shown on display 36-2. Finally, the RO key is used to introduce the rim offset B into the system. The range of acceptable values for the rim offset are from 1.0 to 9.9 inches. As in all other cases, the rim offset being entered into the machine is displayed on display 36-2 with 36-1 containing all zeros.

The 0 through 9 keys are used to introduce the various parameters after one of the keys has been pressed.

Also provided on the keyboard is a stop key "STOP" which disengages the motor and idler solenoid, and engages the brake solenoid until the wheel is stopped.

Hood switch SW1 operates in two modes. When the hood is up, the switch is open. In this mode, the switch operates in a manner similar to that of the stop switch on the keyboard. When the hood is down, switch SW1 is closed and the balance cycle is started.

The check key C on the keyboard shifts the keyboard to second level functions. One of the keys marked CAL has a second level function of initiating the calibration mode. The display 36-1 displays the characters CAL to indicate that the machine is in the calibration mode.

Additional second level keys are denoted as ounce, gram, precision (PREC), static (STA), and dynamic (DYN). The ounce key sets the weight mode in ounces. It also ensures that force readings are in 0.25 ounce increments, with all readings less than 0.25 ounces being reported as 0.

The gram key sets the weight mode in grams so that the readings are in five-gram increments with any reading less than 10 grams being given as a 0.

The precision key, on the other hand, eliminates the zero compensation entirely. The precision key is used in conjunction with the ounce and gram keys. In the ounce mode, the precision key causes a display to be in 0.1 ounces with a maximum reading of 9.9 ounces. If in the gram mode, the display is in 0, 2, 5, 7 increments.

The static key sets the balance mode to static. It turns on the static LED to denote that that operation has been selected. It causes the imbalance calculations to be performed in a single plane (outer rim only).

The dynamic key sets the balance mode on dynamic and in this way turns off the static LED. The imbalance calculations under the dynamic mode are performed in two planes.

Having presented the details of the electronic and mechanical portions of the wheel balancer, a detailed discussion of the use and operation of the preferred embodiment of the wheel balancer will now be presented. The wheel balancer is physically set up so that the main shaft 162 is generally horizontal with the piezoelectric transducers 46, 48 oriented to receive a vertical force generated by the movement of the main shaft.

Before securing a wheel to the extension of the main shaft, the wheel balancer must be calibrated. In order to do this, an operator turns on the power switch SW3 to place the unit in a ready condition with readout 36-1 displaying the CAL message. The operator then mounts a known calibration weight at a known position on the face portion 169 of the face plate 167. The machine is then programmed to simulate a balance cycle to obtain raw, uncompensated data. With regard to FIG. 8, the uncompensated data is in the form of forces $P_L$ and $P_R$ magnitudes and associated phase angles. Since the weight and position of the slug is known, the equations discussed hereinbefore are worked backwards to determine multiplying correction factors for the magnitudes of $P_L$ and $P_R$ and to determine additive correction factors for their associated phase angles. A calibration cycle is required each time the machine power is turned off. As part of the calibration cycle, the zero reference tooth 97 of wheel 180 is detected by optical interrupter 181 and stored within RAM memory 14. This zero reference tooth is then employed when calculating the correction angle $\theta c$ in the manner described hereinbefore.

The next step is to remove the calibration weight and to then place a wheel T to be balanced onto the main shaft 162. The wheel is secured to the main shaft up against a face plate by a conical wheel retaining lug 171. The CPU the moves into a data gather mode operative in the following manner.

Figure 11:
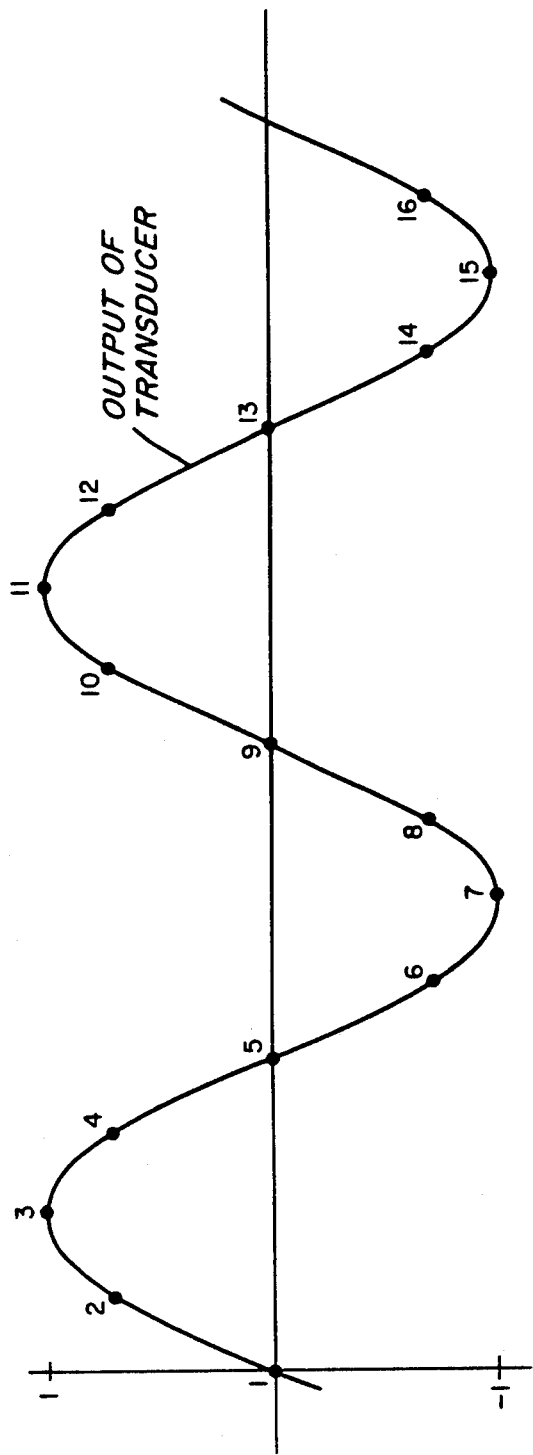
FIGS. 11 and 12 are graphs used to explain the operation of the wheel balancer of FIG. 1.
Figure 12:
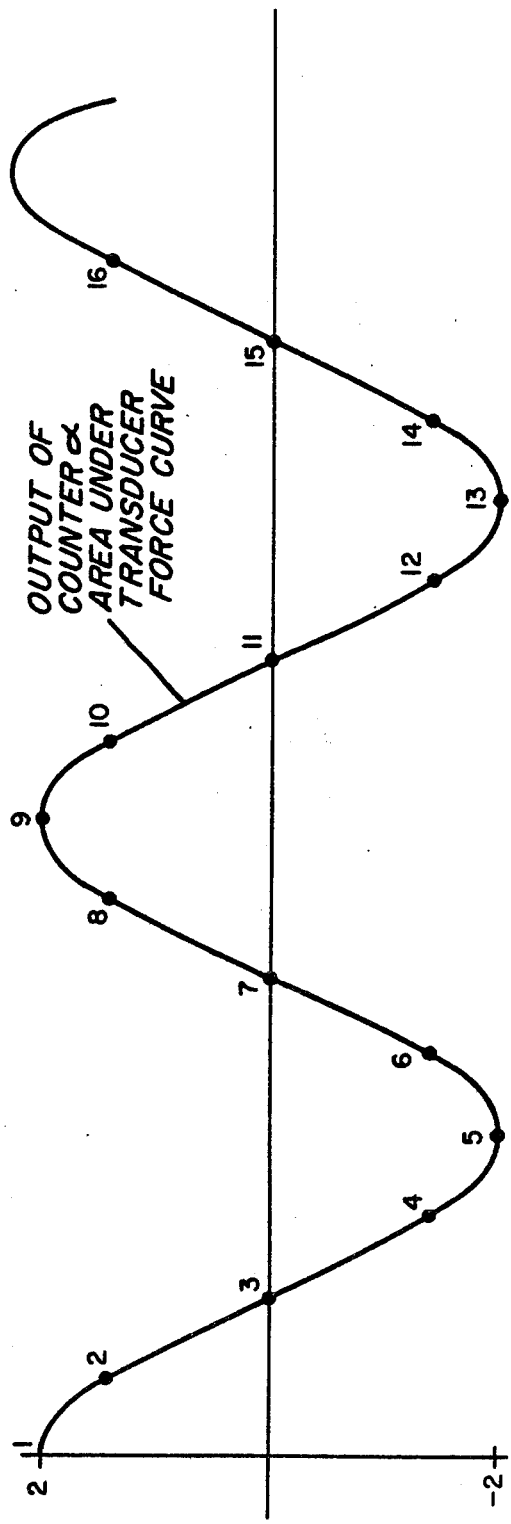
Figure 13:
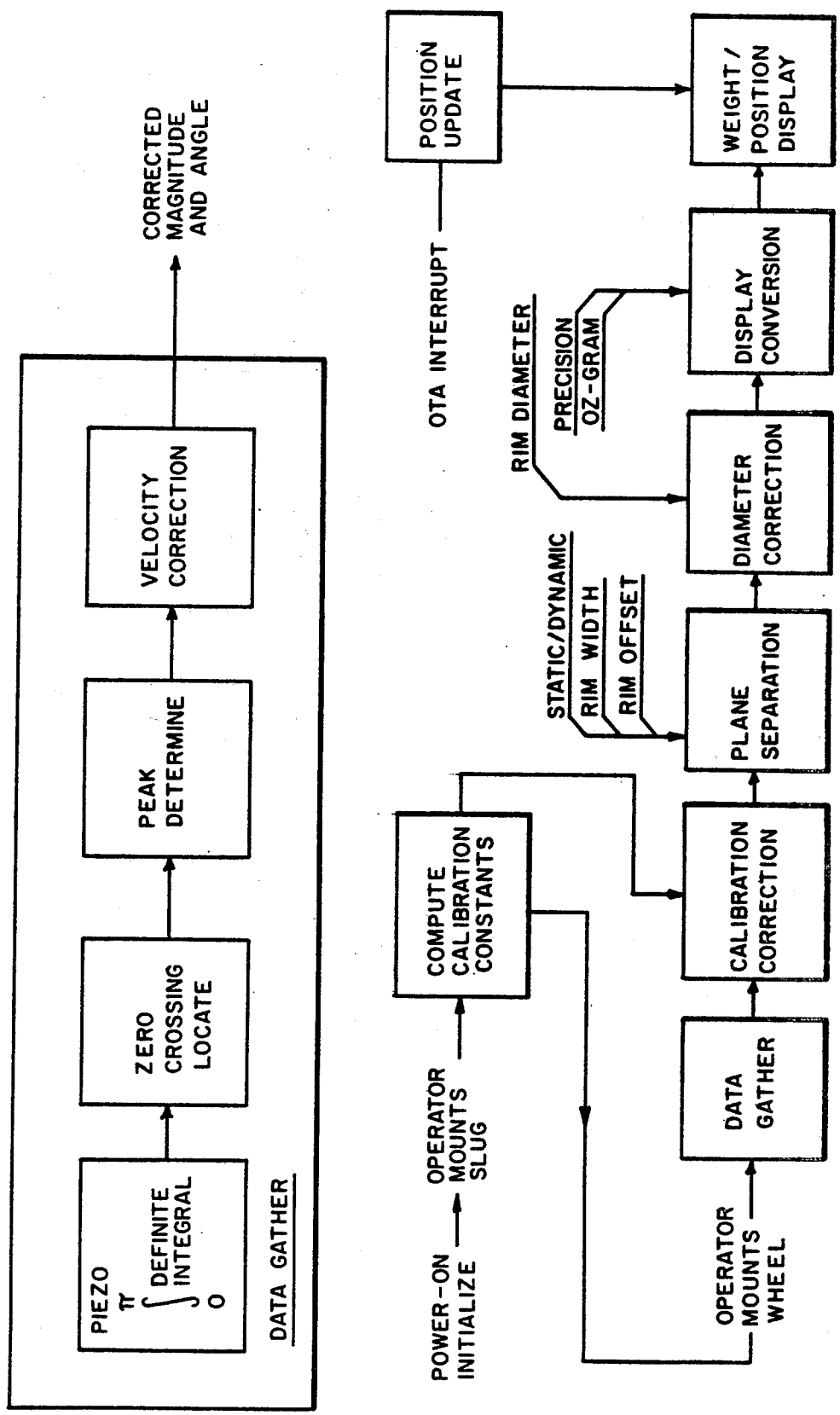
FIG. 13 is a block diagram showing data flow when operating the electronic wheel balancer of FIG. 1.

With reference to FIGS. 11 and 12, the CPU evaluates the definite integral of the forces detected by each of the piezoelectric transducers 46, 48 by finding the area under the force curve. This is accomplished by sampling the VCO counters 605 and 606 at teeth 180° apart and substracting the two readings to determine the number of counts per half cycle. This definite integral is evaluated for a half cycle at 30° intervals to define a cross correlation cosine function.

Having done this, it now becomes necessary to find the zero crossing points of the cross correlation function. The cross correlation data from the piezo integration is used to find the "coarse" zero crossing of the integrated function. Since the cross correlation cosine function is linear around the zero crossing, it becomes easy to interpolate between the "coarse" zero crossing points to determine the precise zero crossing tooth of the timing wheel 180. This zero crossing point of the cross correlation function corresponds to the maximum/minimum location of the piezo force curve.

The zero crossing tooth occuring at the precise zero crossing point, and the tooth 180° away from it are selected as the points to sample the VCO counters 605 and 606. These counter readings are subtracted from one another to evaluate the definite integral from the maximum peak to the minimum peak. The values of these integrations are the representations of the piezo force peak values.

Because the main shaft is free wheeling, it is constantly, however imperceptibly, slowing down during a given measurement cycle. For this reason, it becomes necessary to provide a velocity correction of any data gathered from the piezoelectric transducers 46 and 48. Velocity information is obtained while the VCO counter is being sampled during the determination of peak value. The integrated force value, which represents the peak value of the piezoelectric transducer forces, is corrected for variations in velocity caused by slow down of the vehicle wheel.

To recap, the digital representation of the analog inputs from the piezoelectric crystal sensors is brought about through the use of a voltage controlled oscillator (VCO) 54, 56 clocking a 16-bit counter 605, 606 as the analog to digital conversion hardware.

The CPU is also capable of orchestrating the performance of certain functions on the digital data developed. In particular, the integral of the forces generated by the piezoelectric transducers is obtained to determine the zero crossing points of the integrated function, and to determine the peak amplitude of the integrated function.

The preferred embodiment of the wheel balancer evaluates the definite integral of each piezoelectric force by finding the areas under the force curve (see FIG. 11). This is accomplished by sampling each of the VCO counters at teeth 180° apart and subtracting the two readings to determine the number of counts per half cycle. This definite integral is evaluated for four cycles at 30° intervals. If the definite integral evaluations were plotted, they would define a cross correlation cosine function as shown in FIG. 12.

In order to determine the zero crossing point for each of the piezo forces $P_L$ and $P_R$, the cross correlation data is used to find the "coarse" zero crossing of the integrated function. The preferred embodiment of the wheel balancer interpolates between the "coarse" zero crossing points to determine the precise zero crossing tooth of the timing wheel 180. This zero crossing point of the cross correlation function corresponds to the maximum/minimum location of the piezo force curve of FIG. 12.

After the zero crossing tooth is determined, the wheel balancer samples the VCO counters at this tooth and a tooth located 180° away. These counter readings are subtracted to evaluate the definite integral from the maximum peak to the minumum peak. The value of this integration is the representation of the piezo force peak value $P_L$ and $P_R$.

While sampling each VCO counter, the velocity is also recorded to be used in velocity correction. Velocity is continually monitored and the force signals from the transducers 46 and 48 are effectively compensated by the factor of $(V_O/V_A)^2$ where $V_O$ is the velocity during a particular rotation cycle and $V_A$ is a predetermined velocity of constant value. More specifically, the force integral value for each of the transducer forces is compensated by the ratio of half cycle time which equates to the above ratio squared. In a preferred embodiment, the time between half revolutions or cycles of the rotating shaft as noted on the time wheel 180 is stored in RAM memory. As already stated, the integrated force is a linear function of velocity, therefore, velocity correction involves only a linear correction. The integrated force peak is multiplied by the following correction factor:

(time per half cycle as stored in memory) divided by (the predetermined normal up-to-speed half cycle time)

With the calibration parameters having been determined and the data gathered, both the parameters and the data are used to compute the correct $P_L$ and $P_R$ magnitudes and angles.

Each of the forces $P_L$ and $P_R$ has a magnitude and angle component. Thus, the corrected magnitude of either of the force components is equal to the detected force magnitude multiplied by the calibration factor determined initially during the calibration of the machine. In the same way, the angular corection component of the force is equal to the detected angle minus the correction angle as determined during the calibration step.

The corrected, compensated forces and angles that have been gathered from the balance cycle are applied to the force equations discussed hereinbefore to determine the forces and angles of the imbalances at each plane of the wheel. $P_L$ (or $P_R$) are separated into vector components parallel and perpendicular to $P_R$ (or $P_L$). These components are used to compute the F1X, F1Y, F2X and F2Y components. The X and Y components are used to compute the $F_{IN}$ and $F_{OUT}$ forces and angles. The sine, cosine and arc tangent functions used in the equations have been implemented with lookup tables. Rim offset B and rim width C are compensated to correct for the true center of mass of the weights in a manner such as that described in U.S. Pat. No. 4,193,304 (Hofmann).

The rim diameter D of the wheel being balanced is introduced into the equation along with the rim force magnitudes just determined in order to arrive at the imbalance weights. The rim diameter D is compensated to correct for the true center of mass of the weights in a manner such as that set forth in the aforementioned U.S. Patent to Hofmann.

The magnitudes of the inner and outer weights are then placed into a display format and shown on the display 36 in eye readable format. The data is rounded off and converted to grams or ounces and displayed with desired precision. The left display 36-1 corresponds to the inner rim weight and the right display corresponds to the outer rim weight 36-2.

Many changes and modifications in the above embodiment of the invention can be made without departing from the scope of the invention. Accordingly, the scope is intended to be limited only by the appended claims.

What is claimed is:

1. Apparatus for measuring unbalance in a vehicle wheel, said apparatus comprising:
    a drive shaft for carrying the vehicle wheel to be balanced;
    means for mounting the wheel to the drive shaft;
    transducer means for detecting at least one force indicative of an unbalance condition of the drive shaft;
    a voltage controlled oscillator responsive to said signal generated by said transducer means;
    a counter responsive to the output of said voltage controlled oscillator;
    means for sampling the counter at two points in time separated from each other by a predetermined time period;
    means for subtracting the two samples to determine the number of counts per predetermined time period;
    means for finding the coarse zero crossing points of the function resulting from the subtraction;
    means for interpolating between the coarse zero crossing points to determine the precise time of zero crossing;
    sampling means for sampling the counter at the precise zero crossing time and said predetermined time period away;
    and
    means for subtracting these two counter readings in order to provide the peak value of the transducer means.

2. The apparatus of claim 1, wherein said predetermined time period is one-half rotation cycle of said drive shaft.

3. The apparatus of claim 1, further comprising a rotating timing disk having a plurality of timing teeth positioned about the periphery of said disk;
    detecting means for detecting the movement of said teeth during the rotation of said disk;
    means responsive to the output of said detecting means for determining the particular one of said teeth passing by said detecting means at said precise time of zero crossing, and the particular one of said teeth located 180° away from said tooth passing by said detecting means at said precise time.

4. The apparatus of claim 3, wherein said sampling means includes means for activating said sampling means at the detection of said timing tooth associated with the precise time of zero crossing and the tooth located 180° away.

5. The apparatus of claim 1, further comprising means operative in a first mode for accelerating said drive shaft to a predetermined rotation rate, and operative in a second mode for allowing said drive shaft to decelerate in a freewheeling state.

6. The apparatus of claim 1, wherein said detecting means comprises a pair of transducers spaced from each other to detect the radial force of said shaft, each transducer producing a force signal.

* * * * *